G. S. BREWSTER.
LOCK FOR MILK CAN TOPS.
APPLICATION FILED AUG. 8, 1921.

1,420,811. Patented June 27, 1922.

Inventor
Guy S. Brewster
By Attorney
Frank Warren

UNITED STATES PATENT OFFICE.

GUY S. BREWSTER, OF SEATTLE, WASHINGTON.

LOCK FOR MILK-CAN TOPS.

1,420,811.  Specification of Letters Patent.  Patented June 27, 1922.

Application filed August 8, 1921. Serial No. 490,484.

*To all whom it may concern:*

Be it known that I, GUY S. BREWSTER, a citizen of the United States, residing at Seattle, in the county of King and State of Washington, have invented a certain new and useful Improvement in Locks for Milk-Can Tops, of which the following is a specification.

My invention relates to improvements in means for securing the tops or covers on milk cans and the object of my invention is to provide a spring clip of strong and simple construction that may be quickly and easily slipped over the top of a milk can from one side thereof after the cover has been inserted in the can to prevent accidental displacement of the cover.

Another object is to provide a clip having means arranged to engage beneath the bead or flange at the top of a milk can to prevent the lock from sliding upwardly on the neck of the can and to thereby form non-yielding means for securing the cover to the can.

A further object is to provide a clip of this nature in which all parts lie close to the can so that they will not offer any obtrusion to handling the cans or to piling them one upon the other.

With the above and other objects in view as will be apparent from the following description the invention consists in the novel construction, adaptation and combination of parts of a clip for the top of a milk can as will be more clearly hereinafter described and claimed.

In the accompanying drawings, Figure 1 is a view in side elevation of a clip constructed in accordance with my invention;

Like reference numerals designate like parts throughout the several views.

Figure 1:
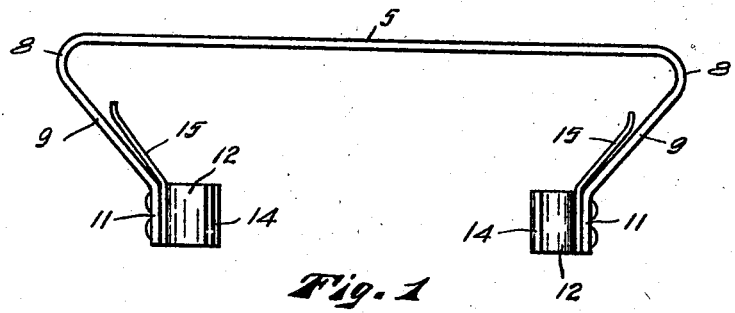

In handling milk cans it often happens that such cans are dropped or are allowed to tip over with sufficient violence to cause the cover of such cans to be forced out of the cans, thereby allowing the milk to be spilled. My invention is intended to prevent the loss of milk by preventing the covers of the cans from coming out when the cans are roughly handled.

In the drawings, I have shown a clip formed of a relatively thin flat piece of resilient metal, as spring steel, having a straight flat section 5 that is arranged to fit over and rest upon the cover 6 of a milk can 7. The straight section 5 is bent at both ends, as at 8, at an angle of more than ninety degrees to form relatively short convergent side members 9 that are arranged to extend downwardly along the inclined sides 10 of the flaring mouth of the milk can 7.

Figure 2:
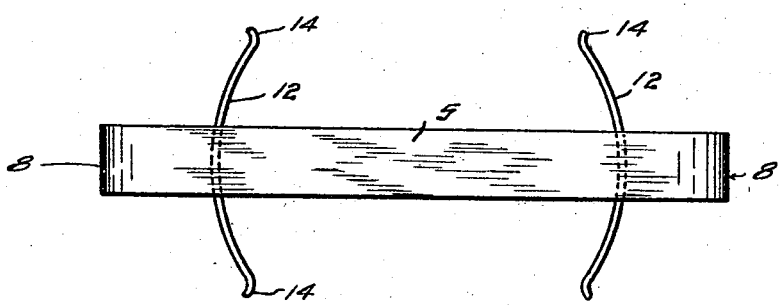
Fig. 2 is a plan view of the same.
Figure 3:
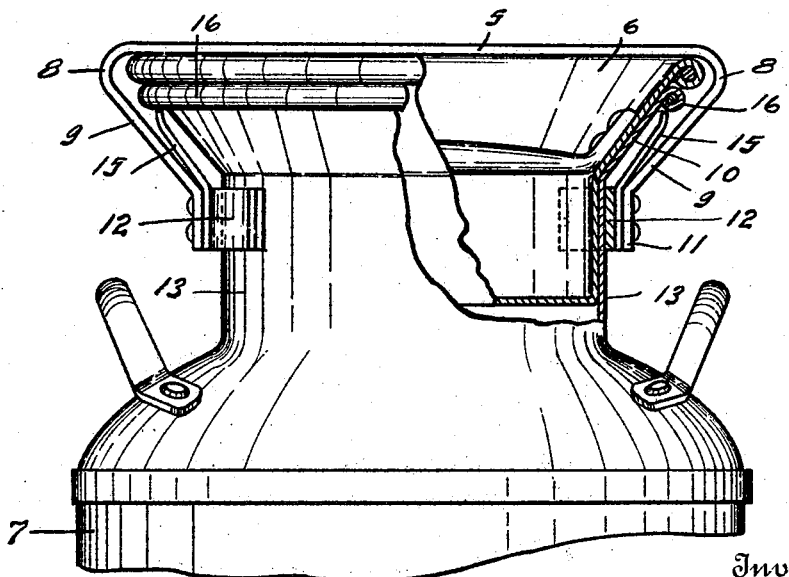
Fig. 3 is a view partly in elevation and partly in cross section showing the clip applied to the top of a milk can.

The convergent side member 9 terminate in straight end portions 11 to which curved arms 12 of spring metal are securely riveted, said arms being arranged to project equal distances on both sides of the end portions, as shown in Fig. 2, to fit the curvature of the neck portion 13 of the milk can. The outer ends of the arms 12 are preferably curved rearwardly as at 14, to facilitate the application of the clip to a milk can.

The clip is further provided at both ends with resilient stop members 15 that are secured between the arms 12 and the straight end portions 11 of the clip and that extend upwardly on the inside of the convergent sides 9 in such a manner as to engage beneath the bead 16 that is formed around the upper edge of the mouth portion of the milk can, said stop member serving as a positive and unyielding means for preventing the clip from being removed from the can in any way except by moving the same sidewise.

When the clip is to be applied to a milk can the cover is first inserted in the can and the clip is then slipped over the top of the can from one side so that the curved arms 12 fit the neck 13 of the can and the stop member 15 will project beneath the bead 16 sufficient pressure being exerted on the clip at the time it is applied to the can to spring the several parts outwardly and permit the curved arms 12 to pass over the neck 13 of the can.

After the clip is applied to a can it may be removed by slipping it off of the sides of the can and while it is on the can it will serve as a positive lock to prevent removal of the can cover 6.

If the clip members 15 are dispensed with the clip will still be efficient and will retain the cover on a milk can by reason of the engagement of the curved arms 12 with the neck portion of the can.

This clip is strong and simple in construction, efficient in operation and not expensive to manufacture. It is not difficult to put on and take off of milk cans and when in use it lies close to the cans, and offers no obstructions that interfere with handling of the cans.

The foregoing description taken in connection with the accompanying drawings clearly disclose the principles of construction and method of operation of my invention, but, while I have shown and described what I now consider to be the preferred embodiment of my invention it will be understood that the disclosure is merely illustrative and that such changes in my device may be made as are within the scope and spirit of my invention.

What I claim is:

1. A milk can clip comprising a strip of flat spring metal consisting of a straight top member that is bent at both ends to form convergent side members, curved arms secured to the ends of said convergent side members, and stop members secured to the ends of said convergent side members and extending upwardly along the inner sides of said convergent side members in spaced relation and terminating at a distance from the straight top member.

2. A milk can clip comprising a strip of flat spring metal having a straight top portion arranged to rest upon the top of a milk can cover and bent downwardly at both ends to form convergent side members, curved arms secured to the bottom ends of said convergent side members and arranged to fit the neck of a milk can, and means secured to said convergent side members and arranged to engage beneath the peripheral bead at the top of a milk can.

In witness whereof, I hereunto subscribe my name this 26th day of July, A. D. 1921.

GUY S. BREWSTER.